(12) United States Patent
Shoji et al.

(10) Patent No.: US 10,249,072 B2
(45) Date of Patent: Apr. 2, 2019

(54) VEHICULAR DISPLAY DEVICE FOR MOVING IMAGES

(71) Applicant: Yazaki Corporation, Tokyo (JP)

(72) Inventors: Kazumasa Shoji, Shizuoka (JP); Takayuki Ono, Shimada (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/905,996

(22) Filed: Feb. 27, 2018

(65) Prior Publication Data
US 2018/0268594 A1 Sep. 20, 2018

(30) Foreign Application Priority Data
Mar. 14, 2017 (JP) .................................. 2017-048703

(51) Int. Cl.
*G06T 13/80* (2011.01)
*B60K 35/00* (2006.01)
*G09G 3/36* (2006.01)

(52) U.S. Cl.
CPC .............. *G06T 13/80* (2013.01); *B60K 35/00* (2013.01); *G09G 3/36* (2013.01); *B60K 2350/352* (2013.01); *G09G 2380/10* (2013.01)

(58) Field of Classification Search
CPC .. G06T 13/80; B60K 35/00; B60K 2350/352; G09G 2380/10
See application file for complete search history.

(56) References Cited

U.S. PATENT DOCUMENTS

| 2007/0115107 | A1 | 5/2007 | Kageyama et al. |
| 2008/0309475 | A1* | 12/2008 | Kuno .................... B60K 35/00 340/462 |
| 2009/0096714 | A1* | 4/2009 | Yamada ............... G02B 27/017 345/8 |
| 2011/0205633 | A1* | 8/2011 | Suzuki ............... G02B 27/0101 359/631 |
| 2013/0127608 | A1* | 5/2013 | Ishikawa ................ B60K 37/02 340/425.5 |
| 2014/0085327 | A1* | 3/2014 | Treiber ................. G06T 11/206 345/620 |
| 2015/0158387 | A1* | 6/2015 | Satoh ..................... G01D 11/28 345/589 |

(Continued)

FOREIGN PATENT DOCUMENTS

JP 2007-137261 A 6/2007

*Primary Examiner* — Barry Drennan
*Assistant Examiner* — Terrell M Robinson
(74) *Attorney, Agent, or Firm* — Sughrue Mion, PLLC (57) ABSTRACT

A vehicular display device includes an image display device disposed on a position ahead of a driver in a vehicle and displays images, a frame member disposed on a driver side of the image display device and surrounds a part of an image display region on the image display device, and a drive device that moves the frame member relative to the image display device along the image display region. The image display device displays a predetermined image that converges from the frame member toward a convergence point set in advance in the image display region, and, when the drive device moves the frame member, the image display device performs animation display of deforming the predetermined image so as to follow the movement of the frame member while keeping the convergence point fixed.

4 Claims, 8 Drawing Sheets

(56) References Cited

U.S. PATENT DOCUMENTS

2015/0177956 A1\* 6/2015 Han .................. G06F 3/04842
715/771
2018/0100979 A1\* 4/2018 Osumi .................. B60K 35/00

\* cited by examiner

VEHICULAR DISPLAY DEVICE FOR MOVING IMAGES

CROSS-REFERENCE TO RELATED APPLICATION(S)

The present application claims priority to and incorporates by reference the entire contents of Japanese Patent Application No. 2017-048703 filed in Japan on Mar. 14, 2017.

BACKGROUND OF THE INVENTION

1. Field of the Invention

The present invention relates to a vehicular display device.

2. Description of the Related Art

Vehicular display devices have conventionally been developed, including a frame member surrounding a part of an image display region. Japanese Patent Application Laid-open No. 2007-137261 discloses a technique of a vehicular display device having a display partition member that surrounds a first display region and partitions the first display region from display regions other than the first display region.

There is still a room for improvement in presentation effect of the vehicular display device. For example, if the frame member is movable, the presentation effect is improved if a sense of depth can be expressed by combining a movement of the frame member with an image displayed by an image display device.

SUMMARY OF THE INVENTION

It is an object of the present invention to provide a vehicular display device capable of improving a three-dimensional presentation effect.

In order to achieve the above mentioned object, a vehicular display device according to one aspect of the present invention includes an image display device disposed on a position ahead of a driver in a vehicle and configured to display images; a frame member disposed on a driver side of the image display device and surrounding a part of an image display region on the image display device; and a drive device configured to move the frame member relative to the image display device along the image display region, wherein the image display device is configured to display a predetermined image that converges from the frame member toward a convergence point set in advance in the image display region, and the image display device is configured to perform, when the drive device moves the frame member, animation display of deforming the predetermined image so as to follow the movement of the frame member while keeping the convergence point fixed.

According to another aspect of the present invention, in the vehicular display device, it is preferable that the frame member has a ring shape, and the predetermined image is an image representing an inner circumferential surface of a cylinder extending from the frame member toward a deeper side in a depth direction of a screen.

According to still another aspect of the present invention, in the vehicular display device, it is preferable that a moving range of the frame member is set such that the convergence point is located in a region surrounded by the frame member, and the image display device is configured to display the predetermined image in the region surrounded by the frame member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes in detail a vehicular display device according to an embodiment of the present invention, with reference to the drawings. The embodiment does not limit the present invention. Components in the following embodiment include those easily conceivable by those skilled in the art, or those substantially identical thereto.

Embodiment

Figure 1:
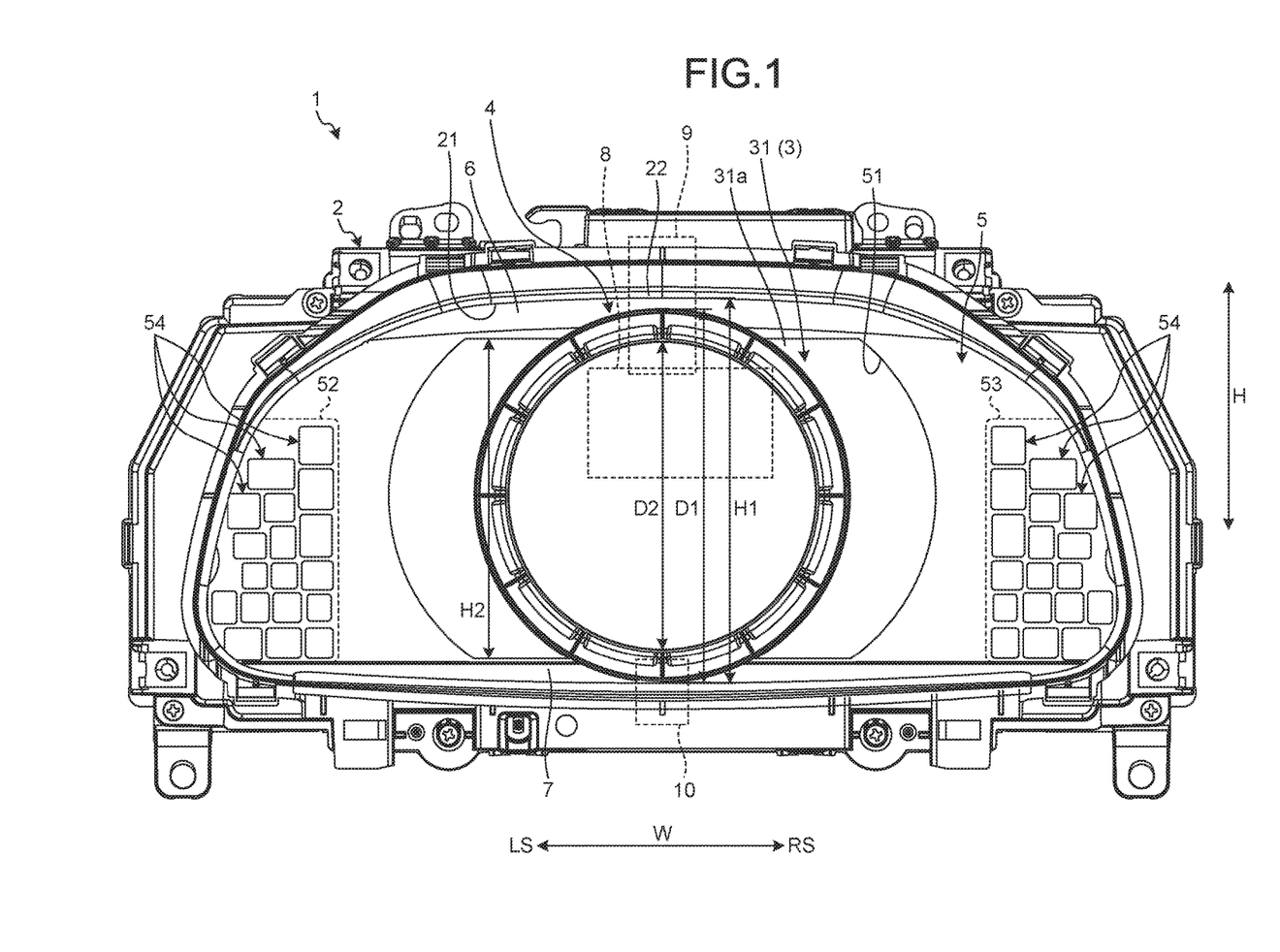
FIG. 1 is a front view of a vehicular display device according to an embodiment.
Figure 2:
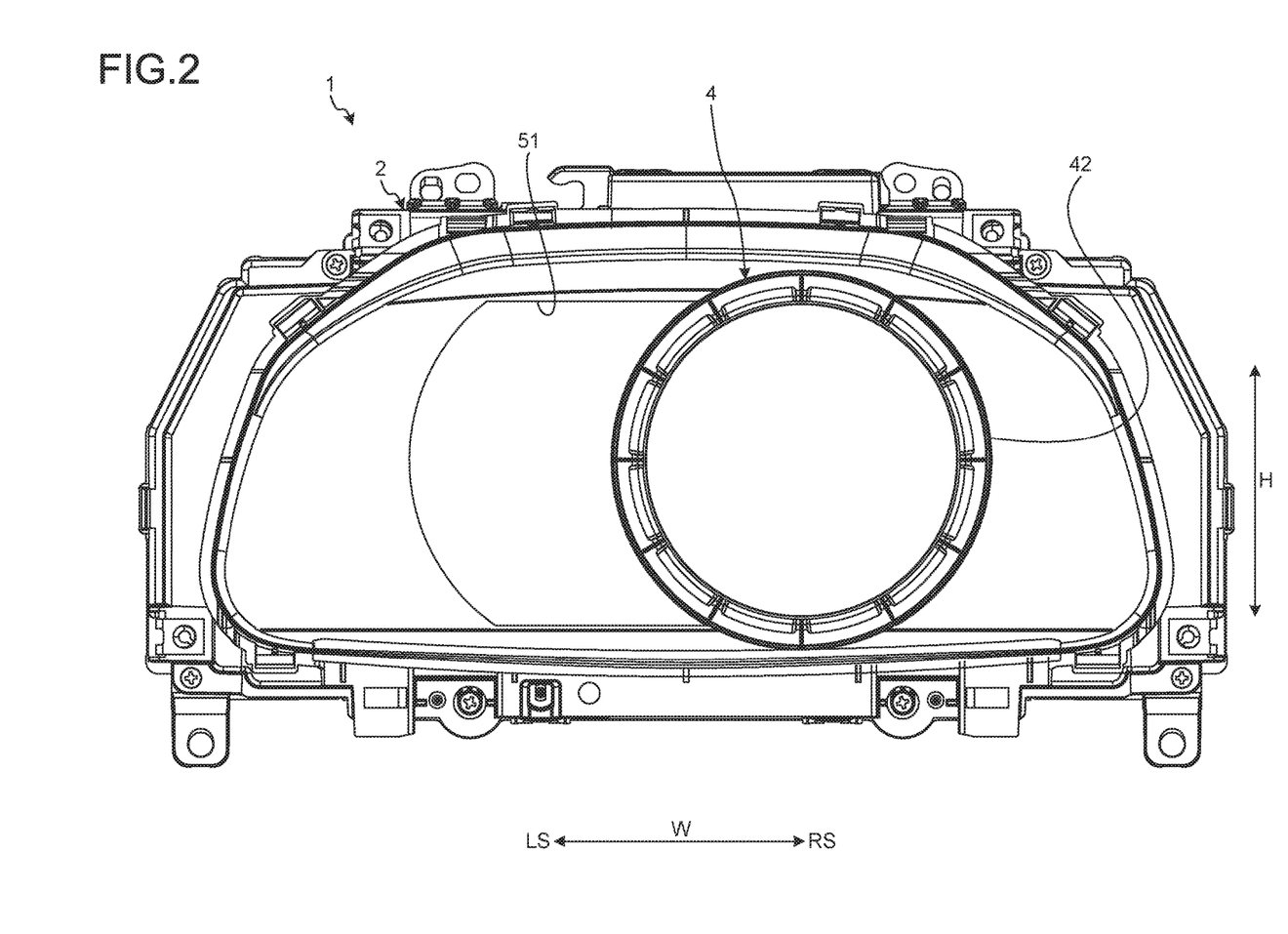
FIG. 2 is a front view illustrating a state where a ring is in a second position at the vehicular display device of the embodiment.
Figure 3:
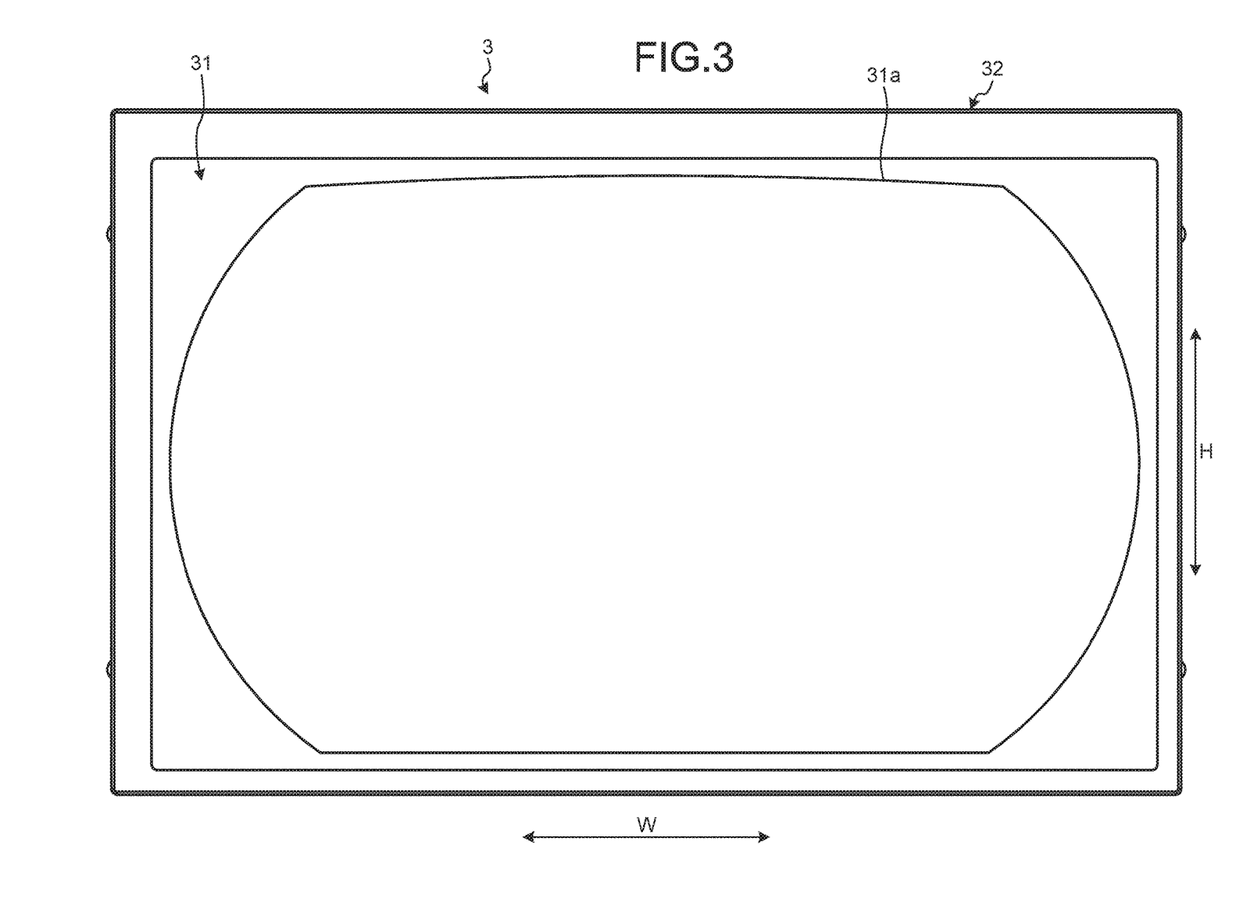
FIG. 3 is a front view of an image display device according to the embodiment.
Figure 4:
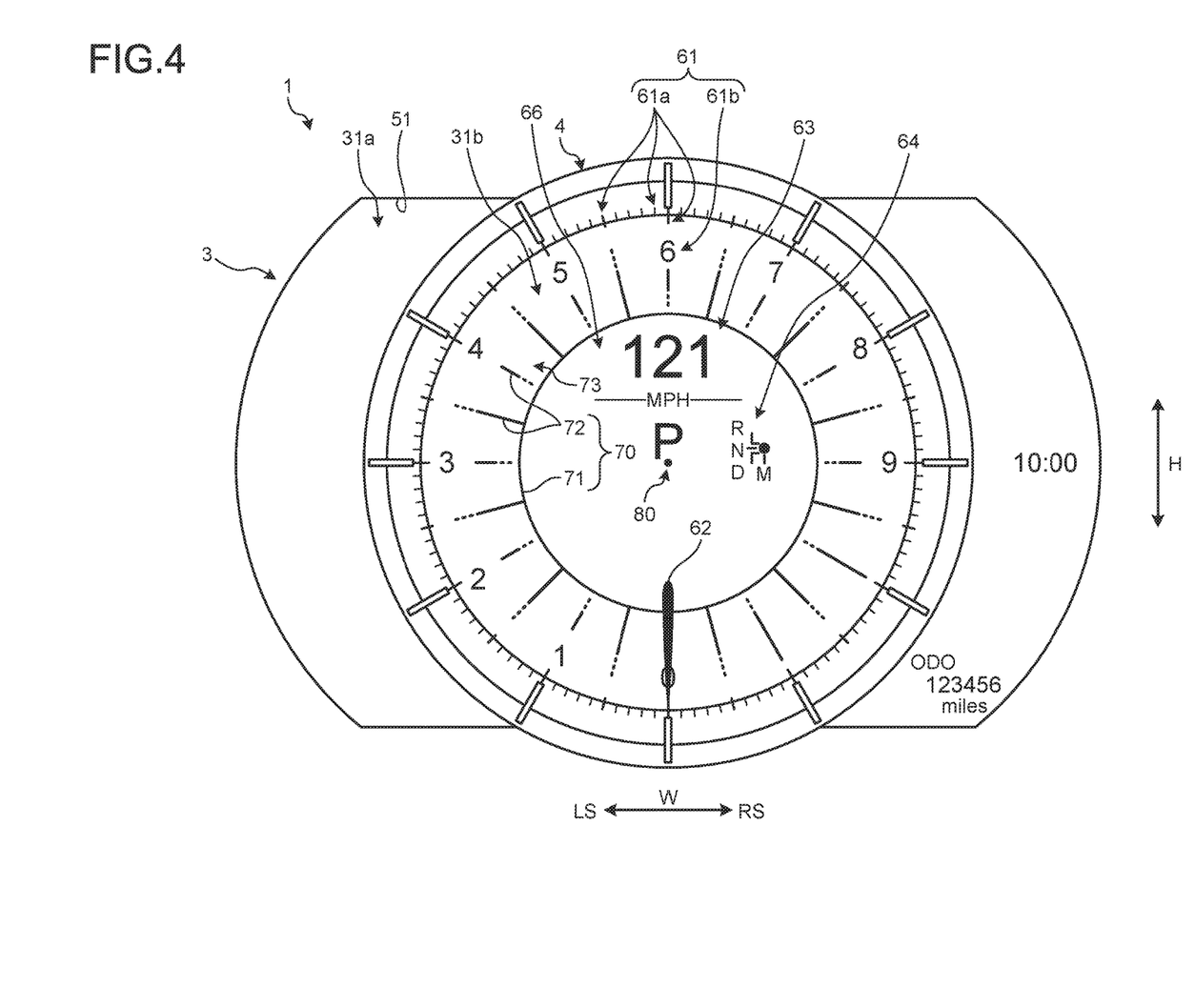
FIG. 4 is a diagram illustrating an exemplary display image when the ring is in a first position.
Figure 5:
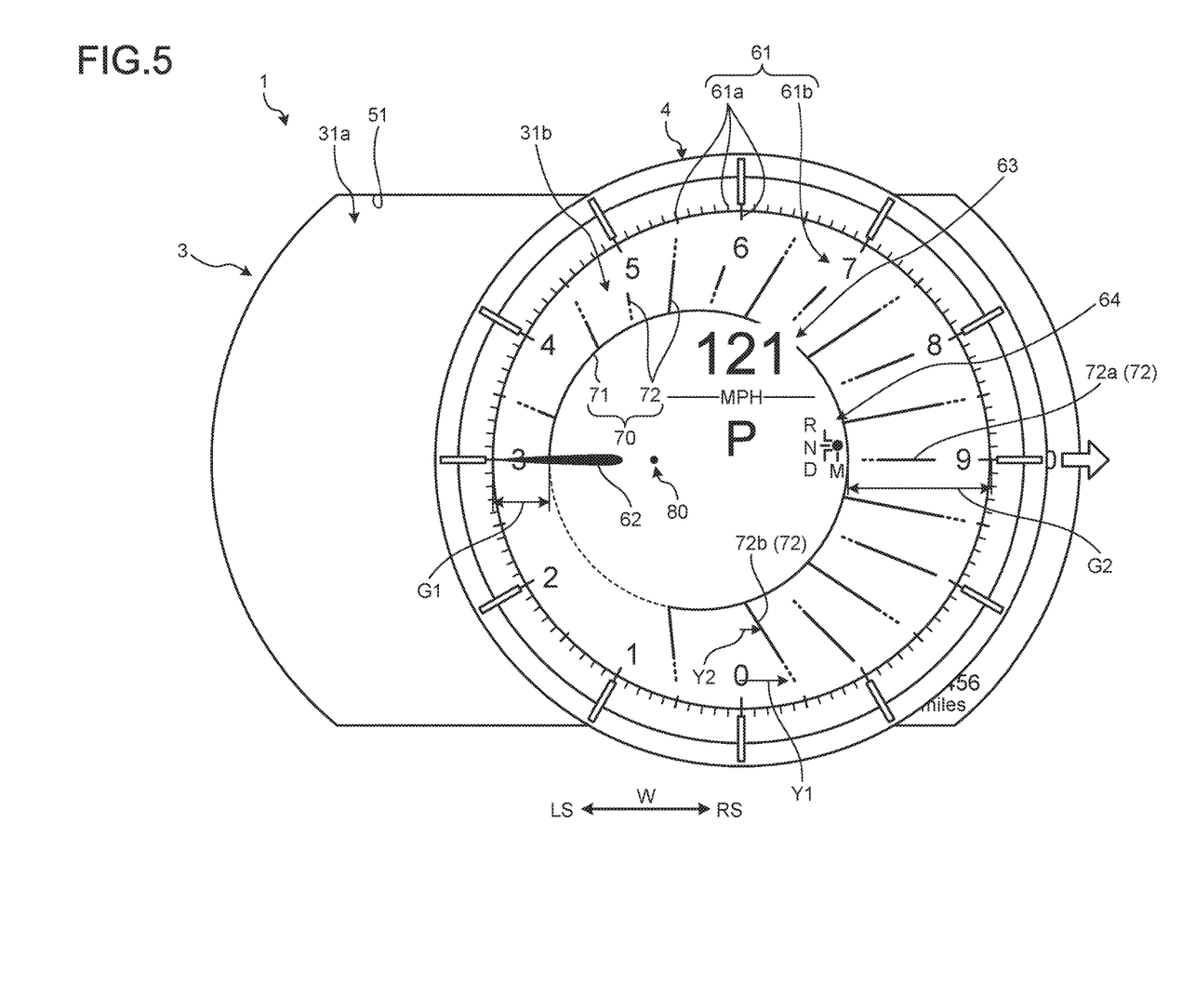
FIG. 5 is a diagram illustrating a state where the ring is in the course of moving toward the second position.
Figure 6:
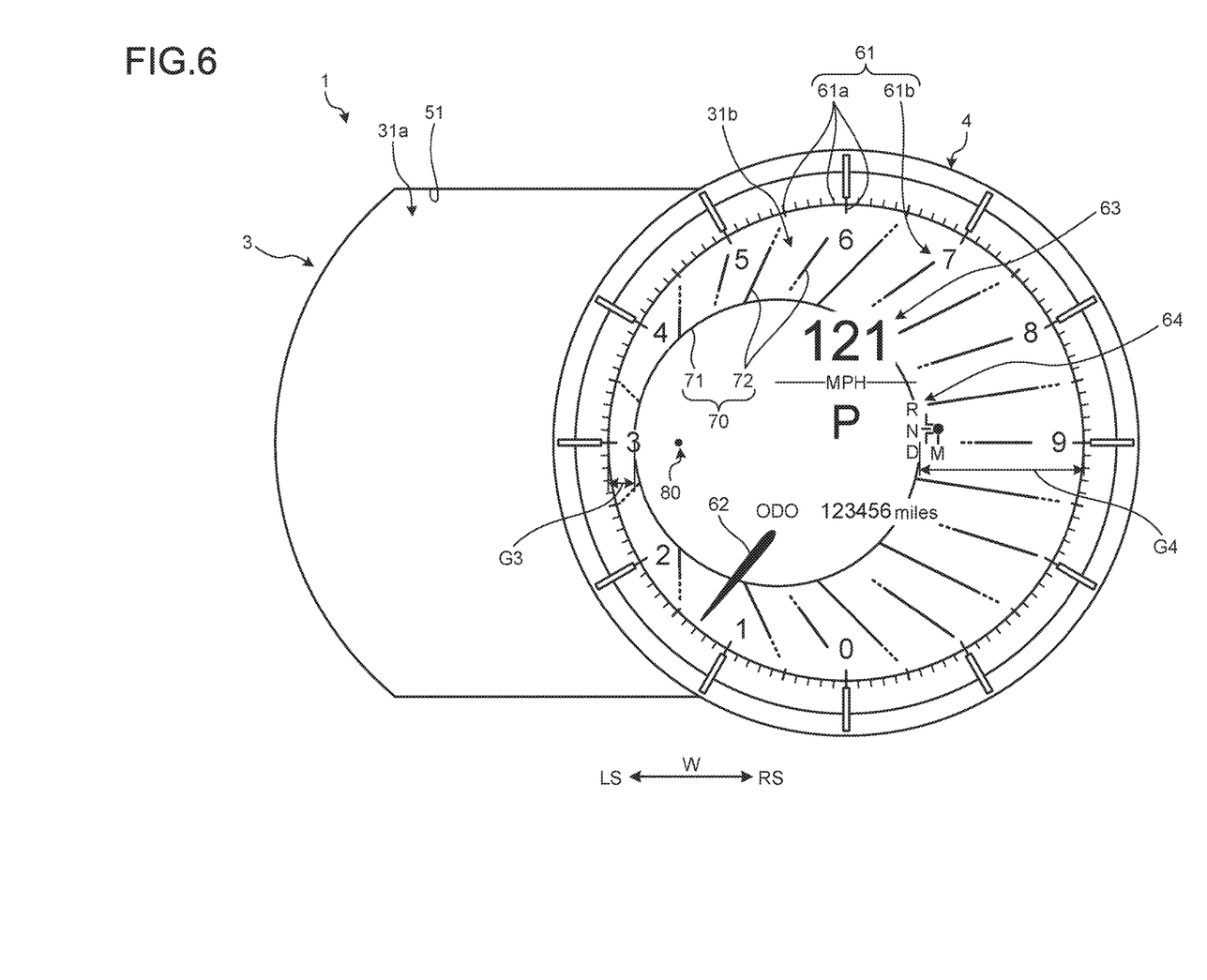
FIG. 6 is a diagram illustrating a state where the ring has completed the movement.

The embodiment will be described with reference to FIGS. 1 to 8. The present embodiment relates to a vehicular display device. FIG. 1 is a front view of the vehicular display device according to the embodiment. FIG. 2 is a front view illustrating a state where a ring is in a second position at the vehicular display device of the embodiment. FIG. 3 is a front view of an image display device according to the embodiment. FIG. 4 is a diagram illustrating an exemplary display image when the ring is in a first position. FIG. 5 is a diagram illustrating a state where the ring is in the course of moving toward the second position. FIG. 6 is a diagram illustrating a state where the ring has completed the movement.

As illustrated in FIG. 1, a vehicular display device 1 according to the embodiment includes a housing 2, an image display device 3, a ring 4, a dial plate 5, and a drive device 8. The vehicular display device 1 of the present embodiment has a display function as a vehicular meter device. The vehicular display device 1 is to be disposed on a position ahead of a driver in a vehicle, and disposed, for example, on an instrument panel.

The housing 2 accommodates and holds therein members and devices, including the image display device 3, the ring 4, and the dial plate 5. The housing 2 has an opening 21. The housing 2 is disposed so as to direct the opening 21 toward the driver, in other words, rearward of the vehicle. In the following description of the vehicular display device 1, a rear side in the vehicle front-rear direction will be called a "front surface side", and a front side in the vehicle front-rear direction will be called a "back surface side". The vehicular display device 1 is disposed so as to direct the front surface side toward the driver. The driver views the image display device 3, the ring 4, and the dial plate 5 through the opening 21.

As illustrated in FIG. 1, the housing 2 has a rectangular shape longer in a vehicle width direction W than in a vehicle upper-lower direction H when viewed from the front side thereof. The housing 2 is made of, for example, a metal or a synthetic resin. The front surface of the housing 2 is provided with a facing 22 projecting from the opening 21 toward the front surface side. The facing 22 is a tubular constituent portion formed integrally with a main body portion of the housing 2. The front surface side of the facing 22 is closed with a transparent cover.

The dial plate 5 is a plate-like member disposed so as to close the opening 21 from the back surface side. The dial plate 5 is made of, for example, a synthetic resin. The dial plate 5 is fixed to the housing 2. A central portion of the dial plate 5 is provided with a window 51. The window 51 is a portion that transmits light. The window 51 may be a through-hole passing through the dial plate 5, or may be a translucent region provided in the dial plate 5. The window 51 has a horizontally long shape longer in the vehicle width direction W than in the vehicle upper-lower direction H. The window 51 of the present embodiment has a shape obtained by projecting short side portions of a rectangle toward the vehicle width direction W into a circular arc shape. The shape of the circular arc portions of the window 51 corresponds to the shape of the ring 4.

Both sides in the vehicle width direction W of the window 51 are provided with display design regions 52 and 53. The display design region 52 is disposed on one side in the vehicle width direction W of the window 51, and the display design region 53 is disposed on the other side in the vehicle width direction W of the window 51. Display designs 54 are disposed in each of the display design regions 52 and 53. The display designs 54 are graphics or characters representing various kinds of information about the vehicle. The display designs 54 are, for example, hollowed regions of printing to the dial plate 5, and are translucent regions. Light sources for the respective display designs 54 are disposed on the back surface side of the display design regions 52 and 53. Each of the graphics or the characters of the display designs 54 is displayed by turning on the corresponding light source.

The image display device 3 is disposed on the back surface side of the dial plate 5. The image display device 3 of the present embodiment is a liquid crystal display device, such as a thin film transistor-liquid crystal display (TFT-LCD). As illustrated in FIG. 3, the image display device 3 includes a liquid crystal display unit 31 and a frame member 32. The frame member 32 surrounds a rim of the liquid crystal display unit 31, and supports the liquid crystal display unit 31.

The image display device 3 is disposed so as to direct the liquid crystal display unit 31 toward the front surface side. A backlight unit is disposed on the back surface side of the liquid crystal display unit 31. The image display device 3 includes a controller that controls the liquid crystal display unit 31 and the backlight unit. The liquid crystal display unit 31 displays any image according to a command from the controller. The image displayed by the liquid crystal display unit 31 is projected toward the front surface side by light emitted from the backlight unit.

The window 51 of the dial plate 5 is smaller in size than the liquid crystal display unit 31. The window 51 is opposed to a main part of the liquid crystal display unit 31. The main part of the liquid crystal display unit 31 is visible from the driver side through the window 51. The dial plate 5 uses the surrounding area of the window 51 to shield the rim of the liquid crystal display unit 31 and the frame member 32 holding the liquid crystal display unit 31 from the driver side. A region in the liquid crystal display unit 31 corresponding to the window 51 is called an "image display region 31a" (refer to FIG. 3). The image display region 31a is a region in which various images are displayed, and is a region visible from the driver side.

Referring back to FIG. 1, the ring 4 is a member disposed on the front surface side of the dial plate 5. The ring 4 of the present embodiment has a circular ring shape. An outside diameter D1 of the ring 4 is slightly smaller than a maximum width H1 in the vehicle upper-lower direction H of the opening 21. An inside diameter D2 of the ring 4 is smaller than a width H2 in the vehicle upper-lower direction H of the window 51. An upper end of the ring 4 is located on a vehicle upper side than an upper end of the window 51. A lower end of the ring 4 is located on a vehicle lower side than a lower end of the window 51.

The ring 4 of the present embodiment is movable in the vehicle width direction W relative to the dial plate 5 and the image display device 3. More in detail, the vehicular display device 1 includes the drive device 8. The drive device 8 is connected to the upper end of the ring 4 through an upper side holding member 9. The upper side holding member 9 is shielded from the driver side by a cover member 6 mounted on the housing 2. The lower end of the ring 4 is connected to a guide unit through a lower side holding member 10. The lower side holding member 10 is shielded from the driver side by a cover member 7 mounted on the housing 2. The guide unit is, for example, a guide rail extending along the vehicle width direction W. The guide unit may define a movable range of the ring 4 in the vehicle width direction W.

The drive device 8 includes a power source, such as a motor, and a drive mechanism, such as gears. The drive device 8 converts rotating torque generated by the motor using the drive mechanism into a driving force in the vehicle width direction W, and transmits the driving force to the upper side holding member 9. The driving force in the vehicle width direction W moves the upper side holding member 9, the ring 4, and the lower side holding member 10 in the vehicle width direction W. That is, the drive device 8 uses the driving force in the vehicle width direction W to move the ring 4 relative to the image display device 3 along the image display region 31a. The drive device 8 switches the direction of rotation of the motor to move the ring 4 toward a left side LS or a right side RS in the vehicle width direction W.

The ring 4 of the present embodiment is movable in the vehicle width direction W between the first position illustrated in FIG. 1 and the second position illustrated in FIG. 2. The first position is a position on the most vehicle left side LS in the movable range of the ring 4. The second position is a position on the most vehicle right side RS in the movable range of the ring 4.

The first position in the present embodiment is a central portion in the vehicle width direction W in the opening 21. The first position is also a central portion in the vehicle width direction W in the window 51. The second position in the present embodiment is a position closer to an end on the vehicle right side RS in the opening 21. The second position is an end on the vehicle right side RS in the window 51.

More specifically, a right end 42 of the ring 4 in the second position overlaps the right end of the window 51, as illustrated in FIG. 2.

The ring 4 is a frame member surrounding a part of the image display region 31a. In the present embodiment, the region of the image display region 31a surrounded by the ring 4 is called an inside region 31b. The ring 4 surrounds a part of the image display region 31a in either of the first position and the second position. The first and second positions are set such that the region inside the ring 4 does not extend off the image display region 31a. In other words, the first and second positions are set such that images can be displayed in the entire region inside the ring 4.

FIG. 4 illustrates the exemplary display image when the ring 4 is in the first position. As illustrated in FIG. 4, the image display device 3 displays, for example, scale images 61, a pointer image 62, a vehicle speed image 63, and a shift position image 64 in the image display region 31a. The image display device 3 displays the images 61, 62, 63, and 64 in the inside region 31b that is the region inside the ring 4.

Each of the scale images 61 is displayed as an indicator of a physical quantity corresponding to an output speed of a drive source mounted on the vehicle. In the present embodiment, the drive source is an engine, and the physical quantity corresponding to the output speed is an engine rotating speed (rpm). The scale images 61 include scale mark images 61a and character images 61b. The scale mark images 61a are lines indicating respective values of the engine rotating speed. The scale mark images 61a are arranged at even intervals along an inner circumferential surface of the ring 4. The character images 61b are images of numbers indicating values of the indicator. The character images 61b are displayed inside the positions of the scale mark images 61a.

The pointer image 62 is displayed as a pointer indicating the current value of the engine rotating speed. More specifically, the pointer image 62 is displayed so as to indicate one of the scale images 61 arranged along the circumferential direction, the indicated scale image 61 being located in a position corresponding to the current engine rotating speed.

The vehicle speed image 63 is an image indicating the current traveling speed of the vehicle. The vehicle speed image 63 is displayed in a position above in the image upper-lower direction of the center of the inside region 31b. The shift position image 64 is an image indicating the current shift position. The shift position image 64 is displayed on the right side in the image lateral direction of the vehicle speed image 63.

In the vehicular display device 1 of the present embodiment, the ring 4 serving as a three-dimensional decorative member is disposed on the front surface side of the image display device 3. The ring 4 enhances a three-dimensional appearance of the display unit including the image display device 3.

The vehicular display device 1 of the present embodiment further provides a natural sense of depth and a layered appearance using a presentation of coordinating the moving ring 4 with images displayed by the image display device 3. The presentation given by the vehicular display device 1 of the present embodiment will be described with reference to FIGS. 4 to 8. As illustrated in FIG. 4, the image display device 3 displays a predetermined image 70. The predetermined image 70 of the present embodiment is an image representing an inner circumferential surface of a cylinder. More specifically, the predetermined image 70 represents the cylinder that extends from the ring 4 toward a depth direction of a screen. The cylinder represented by the predetermined image 70 is concentric with the ring 4. The predetermined image 70 appears to the driver to be a cylinder that extends from the ring 4 toward the back surface side.

The predetermined image 70 includes an outline portion 71 and perspective lines 72. The outline portion 71 is a portion representing an outline of the predetermined image 70. The outline portion 71 of the present embodiment is circular. The outline portion 71 represents an end on a deeper side of the cylinder represented by the predetermined image 70. The outline portion 71 may be a line image, or a border line where the color or brightness changes. In the present embodiment, the outline portion 71 is used as a boundary to display a color different from that of a background 66 in a region 73 on the ring 4 side of the outline portion 71. This color represents the inner circumferential surface of the cylinder. The color of the region 73 may be graded. For example, the color of the region 73 may be lightened toward the ring 4. For example, the color of the background 66 may be a deep color, such as black, and the color of the region 73 may be blue.

The perspective lines 72 are line images for presenting the three-dimensional appearance of the predetermined image 70. The perspective lines 72 are radially drawn toward a preset convergence point 80 serving as the center thereof. The convergence point 80 is, for example, a vanishing point, and is a point representing infinity in the image display region 31a. The convergence point 80 is illustrated only for explanation, and is not actually displayed on the screen. The perspective lines 72 are drawn at predetermined intervals of angles along the circumferential direction of the ring 4.

The outline portion 71 and the perspective lines 72 represent the cylinder that converges from the ring 4 toward the convergence point 80. FIG. 4 illustrates the predetermined image 70 when the ring 4 is in the first position. When the ring 4 is in the first position, the ring 4 is concentric with the circle of the outline portion 71. In this manner, the convergence point 80 of the present embodiment is a position at the center of the ring 4 when the ring 4 is in the first position. When the ring 4 is in the first position, the vehicle speed image 63 and the shift position image 64 are displayed in a circular region surrounded by the outline portion 71.

The positions of the perspective lines 72 of the present embodiment are positions on extended lines of the scale mark images 61a. The perspective lines 72 are drawn so as to decrease in distance therebetween toward the convergence point 80. The perspective lines 72 are images of line segments extending from the scale mark images 61a toward the convergence point 80. The displaying of such perspective lines 72 presents the sense of depth in the inside region 31b. The predetermined image 70 gives the driver a sense of a three-dimensional space in the screen. As a result, the vehicular display device 1 can give the driver an impression as if the vehicle speed image 63 and the shift position image 64 are floating in a space inside the cylinder.

As will be described below, when the drive device 8 moves the ring 4, the image display device 3 of the present embodiment performs animation display of deforming the predetermined image 70 so as to follow the movement of the ring 4 while keeping the convergence point 80 fixed. FIG. 5 illustrates the state where the ring 4 is in the course of moving from the first position toward the second position. In FIG. 5, the ring 4 is moving toward the vehicle right side RS. The image display device 3 moves the scale images 61, the pointer image 62, the vehicle speed image 63, and the shift position image 64 together with the ring 4 toward the vehicle right side RS.

As illustrated in FIG. 5, the outline portion 71 moves toward the vehicle right side RS in conjunction with the movement of the ring 4. The amount of movement of the outline portion 71 is smaller than that of the ring 4. Accordingly, a distance G1 between the outline portion 71 and the ring 4 on the vehicle left side LS becomes smaller than a distance G2 between the outline portion 71 and the ring 4 on the vehicle right side RS. That is, the overall shape of the predetermined image 70 is deformed with the movement of the ring 4.

The perspective lines 72 are deformed with the relative displacement between the outline portion 71 and the ring 4. For example, a perspective line 72a on the vehicle right side RS is lengthened in the image lateral direction with the movement of the ring 4. In contrast, a perspective line 72b extending in the image vertical direction moves toward the vehicle right side RS while tilting such that a moving amount Y1 of a portion thereof outside in a radial direction is larger than a moving amount Y2 of a portion thereof inside in the radial direction. The respective perspective lines 72 are drawn on straight lines connecting the scale mark images 61a with the convergence point 80. That is, the predetermined image 70 converges toward the convergence point 80 even after the ring 4 has moved. Accordingly, the predetermined image 70 follows the movement of the ring 4 under the constraint condition that the predetermined image 70 converges toward the convergence point 80.

FIG. 6 illustrates the state where the ring 4 has completed the movement. In FIG. 6, the ring 4 has reached the second position, and is stopping in the second position. A distance G3 between the outline portion 71 and the ring 4 on the vehicle left side LS has become still smaller than the distance G1 in FIG. 5. A distance G4 between the outline portion 71 and the ring 4 on the vehicle right side RS has become still larger than the distance G2 in FIG. 5. The respective perspective lines 72 have been further displaced from the positions thereof illustrated in FIG. 5 along with the relative displacement between the outline portion 71 and the ring 4.

The above-described animation display of the predetermined image 70 presents the natural sense of depth and the layered appearance in the vehicular display device 1. As a result, the vehicular display device 1 of the present embodiment can improve the three-dimensional presentation effect.

Figure 7:
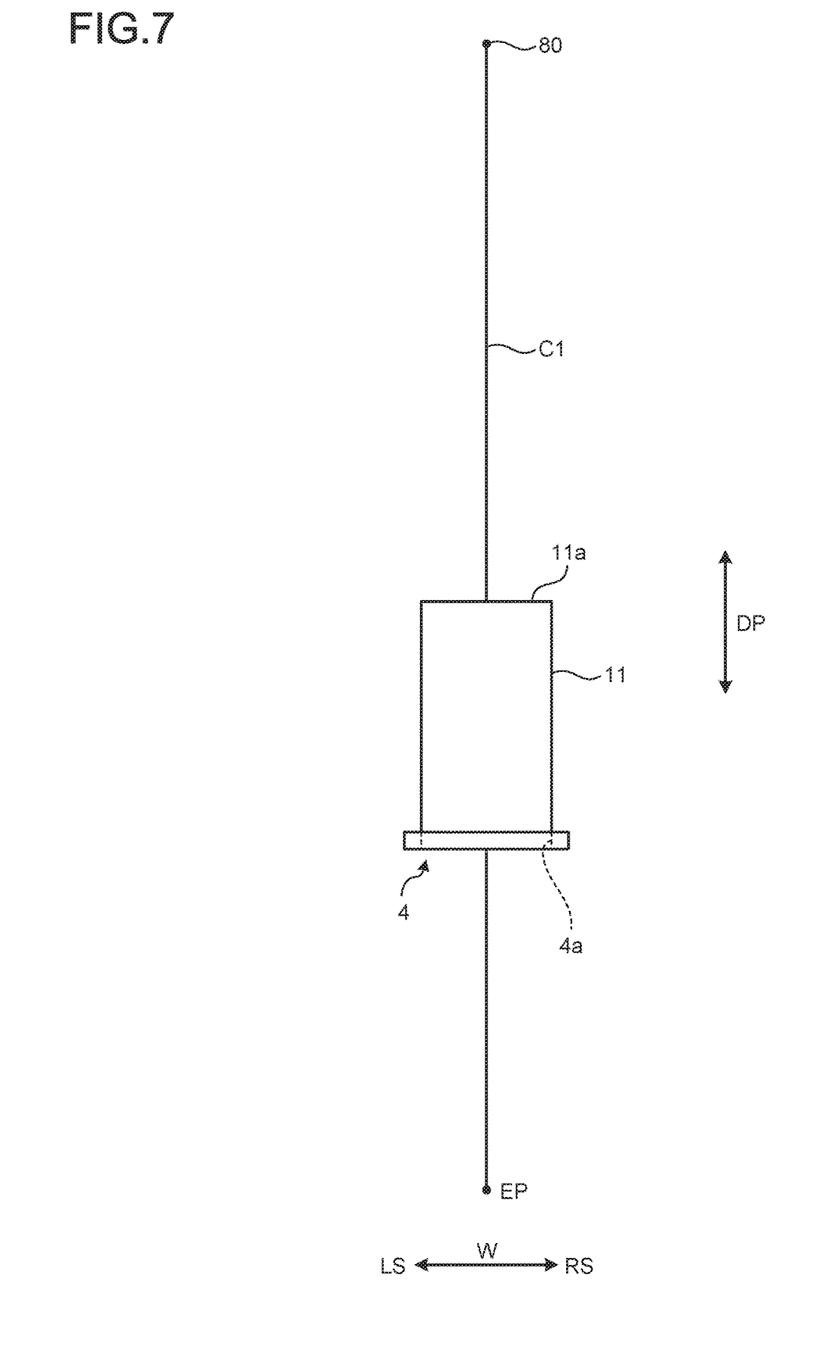
FIG. 7 is a diagram explaining a design example of a predetermined image.

A design example of the predetermined image 70 will be described with reference to FIGS. 7 and 8. The predetermined image 70 is designed using, for example, software for creating three-dimensional (3D) graphics. The ring 4, a cylinder 11, the convergence point 80, and an eyepoint EP are set in a three-dimensional space in the software. The eyepoint EP represents a viewing position of the driver. The coordinates of the ring 4 are set such that the ring 4 faces the eyepoint EP. The position of the ring 4 illustrated in FIG. 7 is the first position.

The position of the cylinder 11 is a position on a deeper side in a depth direction DP of the ring 4. A central axis line C1 of the ring 4 and the cylinder 11 is on a line connecting the eyepoint EP with the convergence point 80. The convergence point 80 is fixed, and the coordinate values thereof do not change. The cylinder 11 extends from an inner circumferential surface 4a of the ring 4 toward the deeper side in the depth direction DP. An end 11a on the deeper side of the cylinder 11 corresponds to the outline portion 71 in the predetermined image 70.

Figure 8:
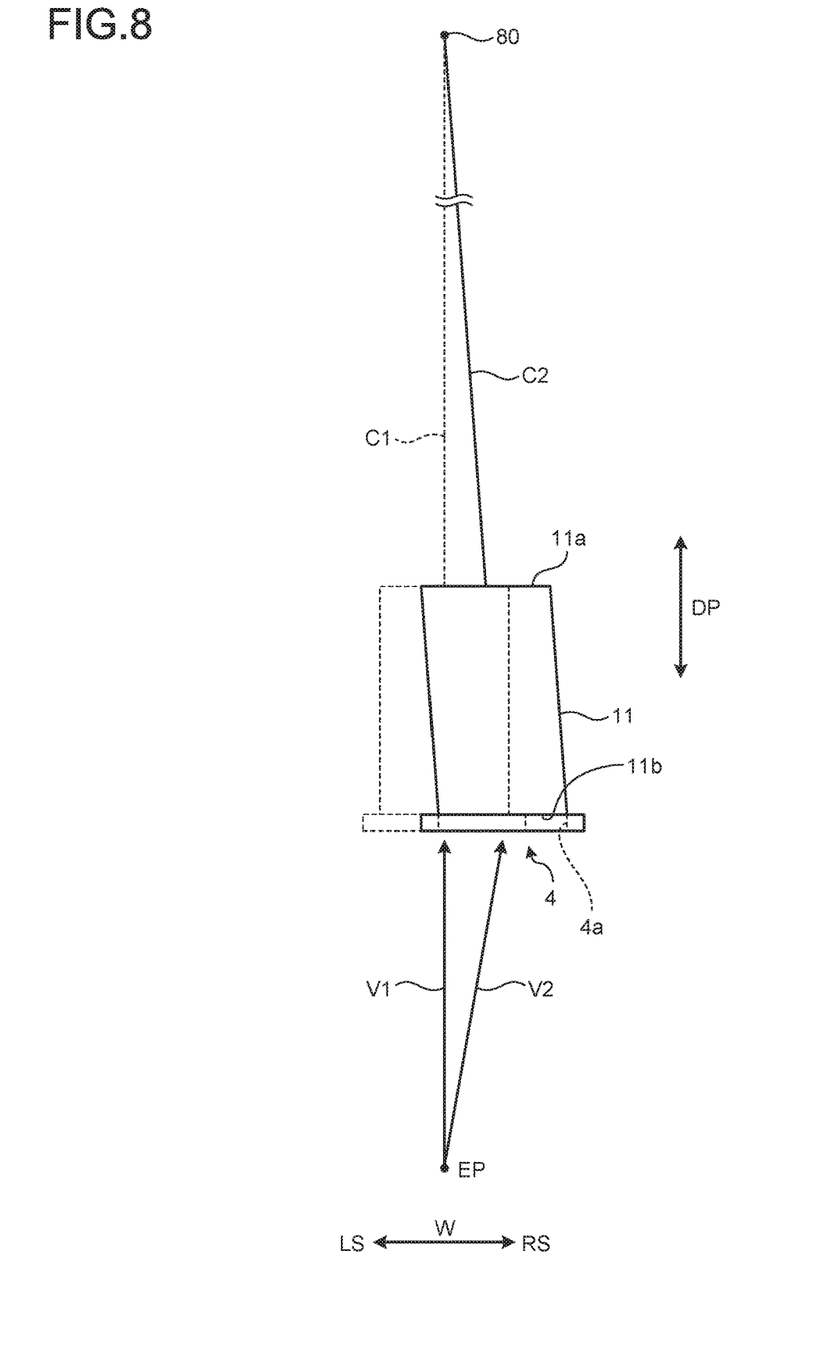
FIG. 8 is another diagram explaining the design example of the predetermined image.

FIG. 8 illustrates a state where the ring 4 is moved toward the vehicle right side RS in the space in the software. The cylinder 11 moves toward the vehicle right side RS so as to follow the movement of the ring 4, and is deformed. An end 11b on the ring 4 side of the cylinder 11 moves toward the vehicle right side RS by the same amount of movement as that of the ring 4. In contrast, the amount of movement of the end 11a on the deeper side of the cylinder 11 is smaller than that of the end 11b on the ring 4 side thereof. Amounts of displacements of various portions of the cylinder 11 are calculated such that a central axis line C2 of the cylinder 11 passes through the convergence point 80.

In the present embodiment, the cylinder 11 is deformable like bellows. Accordingly, the cylinder 11 is displaced so as to have a shape of a parallelogram when viewed from the top, as illustrated in FIG. 8. In other words, the cylinder 11 rotates about the convergence point 80, and is subjected to a shear deformation in the vehicle width direction W. The software designs the predetermined image 70 based on, for example, the shape of the cylinder 11 after being displaced and a change in visual line direction of the driver from V1 to V2. In FIG. 8, the visual line direction V1 is a visual line direction before the ring 4 starts moving, and the visual line direction V2 is a visual line direction in which the moving ring 4 is viewed (watched).

As described above, the vehicular display device 1 of the present embodiment includes the image display device 3, the ring 4, and the drive device 8. The image display device 3 is a device that is to be disposed on a position ahead of the driver in the vehicle and displays images. The ring 4 is an example of the frame member that is disposed on the driver side of the image display device 3 and surrounds a part of the image display region 31a on the image display device 3. The drive device 8 is a device that moves the ring 4 relative to the image display device 3 along the image display region 31a.

The image display device 3 displays the predetermined image 70 that converges from the ring 4 toward the convergence point 80. The convergence point 80 is a point set in advance in the image display region 31a, and is, for example, a vanishing point. When the drive device 8 moves the ring 4, the image display device 3 performs the animation display of making the predetermined image 70 follow the movement of the ring 4 while keeping the convergence point 80 fixed. Since the predetermined image 70 is deformed so as to follow the movement of the ring 4 while keeping the convergence point 80 fixed, the predetermined image 70 three-dimensionally changes. This operation presents the natural sense of depth and the layered appearance.

The predetermined image 70 of the present embodiment is displayed as a background of an information image including the scale images 61, the pointer image 62, the vehicle speed image 63, and the shift position image 64. As illustrated, for example, in FIG. 6, the image display device 3 synthesizes an image appearing as if the vehicle speed image 63 and the shift position image 64 lie on the front surface side of the predetermined image 70. The image display device 3 synthesizes the image so as to display the vehicle speed image 63 and the shift position image 64 at a portion where the predetermined image 70 overlaps the vehicle speed image 63 and the shift position image 64. This operation generates a three-dimensional parallax between the information image and the predetermined image 70. As a result, the natural sense of depth and the layered appearance are presented. The predetermined image 70 three-dimensionally changes in conjunction with the movement of the ring 4 lying in the real space. This operation can give the user an impression of a natural three-dimensional space synchronized with the real space in the picture displayed by the image display device 3.

In the present embodiment, the frame member is the ring 4 having a ring shape. The predetermined image 70 is the image representing the inner circumferential surface of the cylinder 11 extending from the ring 4 toward the deeper side in the depth direction of the screen. The sectional shape of the predetermined image 70 corresponds to the shape of the ring 4. Thus, the continuity and integrity increase between the ring 4 and the predetermined image 70. As a result, the three-dimensional presentation effect of the vehicular display device 1 is improved.

The moving range of the ring 4 may be set such that the convergence point 80 is located in the region surrounded by the ring 4. As illustrated in FIGS. 4 to 6, the convergence point 80 is located in the inside region 31b surrounded by the ring 4. Since the convergence point 80 lies inside the ring 4 regardless of the position of the ring 4, the predetermined image 70 is deformed inside the ring 4. As a result, the three-dimensional presentation effect is improved.

Modifications of Embodiment

Modifications of the embodiment will be described. The shape, the arrangement, the components, and the like of the predetermined image 70 are not limited to those exemplified above. For example, the predetermined image 70 need not include the perspective lines 72. The clear outline portion 71 need not be present in the predetermined image 70. For example, the predetermined image 70 may be an image formed by the perspective lines 72 extending to the convergence point 80 without including the outline portion 71.

The frame member is not limited to the ring 4. The frame member may have a shape lacking a part of the ring 4, that is, may be a member having a C-shape or a U-shape in a front view. The moving direction and the moving range of the ring 4 are not limited to those exemplified above. For example, the ring 4 may move from the first position toward the vehicle left side LS.

The content disclosed in the embodiment and the modifications thereof described above can be carried out in appropriate combinations thereof.

The vehicular display device according to the embodiment includes the image display device that is to be disposed on a position ahead of the driver in the vehicle and displays images, the frame member that is disposed on the driver side of the image display device and surrounds a part of the image display region on the image display device, and the drive device that moves the frame member relative to the image display device along the image display region. The image display device displays the predetermined image that converges from the frame member toward the convergence point set in advance in the image display region. When the drive device moves the frame member, the image display device performs the animation display of deforming the predetermined image so as to follow the movement of the frame member while keeping the convergence point fixed.

The vehicular display device according to the embodiment deforms the predetermined image so as to follow the movement of the frame member, and keeps the convergence point fixed, thereby presenting the three-dimensional sense of depth. As a result, the vehicular display device according to the embodiment provides an effect that the three-dimensional presentation effect can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display device comprising:
an image display device disposed on a position ahead of a driver in a vehicle and configured to display images;
a frame member disposed on a driver side of the image display device and surrounding a part of an image display region on the image display device; and
a motor configured to move the frame member relative to the image display device along the image display region, wherein
the image display device is configured to display a predetermined image that converges, in an initial state, from the frame member toward a convergence point set in advance in the image display region,
the image display device is configured to perform, when the motor moves the frame member, animation display of deforming the predetermined image so as to follow the movement of the frame member while keeping the convergence point fixed, and
the predetermined image continues to converge toward the convergence point while the predetermined image follows the movement of the frame.

2. The vehicular display device according to claim 1, wherein
the frame member has a ring shape, and
the predetermined image is an image representing an inner circumferential surface of a cylinder extending from the frame member toward a deeper side in a depth direction of a screen.

3. The vehicular display device according to claim 1, wherein
a moving range of the frame member is set such that the convergence point is located in a region surrounded by the frame member, and
the image display device is configured to display the predetermined image in the region surrounded by the frame member.

4. The vehicular display device according to claim 2, wherein
a moving range of the frame member is set such that the convergence point is located in a region surrounded by the frame member, and
the image display device is configured to display the predetermined image in the region surrounded by the frame member.

* * * * *